United States Patent
Landais et al.

(10) Patent No.: US 12,041,139 B2
(45) Date of Patent: Jul. 16, 2024

(54) APPARATUS, METHOD AND COMPUTER READABLE MEDIUM FOR RANKING NETWORK FUNCTION SERVICE PRODUCERS

(71) Applicant: NOKIA SOLUTIONS AND NETWORKS OY, Espoo (FI)

(72) Inventors: Bruno Landais, Pleumeur Bodou (FR); Saurabh Khare, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/040,616

(22) PCT Filed: Aug. 5, 2020

(86) PCT No.: PCT/FI2020/050517
§ 371 (c)(1),
(2) Date: Feb. 3, 2023

(87) PCT Pub. No.: WO2022/029361
PCT Pub. Date: Feb. 10, 2022

(65) Prior Publication Data
US 2023/0362268 A1  Nov. 9, 2023

(51) Int. Cl.
*H04L 67/51* (2022.01)
*H04W 48/16* (2009.01)

(52) U.S. Cl.
CPC ............ *H04L 67/51* (2022.05); *H04W 48/16* (2013.01)

(58) Field of Classification Search
None
See application file for complete search history.

(56) References Cited

U.S. PATENT DOCUMENTS 11,343,669 B2 *  5/2022  Wang ...................... H04W 8/20
11,425,636 B1 *  8/2022  Aggarwal ............. H04W 12/08
(Continued)

FOREIGN PATENT DOCUMENTS

| WO | WO 2019/034609 A1 | 2/2019 | |
| WO | WO 2020/030291 A1 | 2/2020 | |
| WO | WO-2021027177 A1 * | 2/2021 | ............. H04L 67/00 |

OTHER PUBLICATIONS

"3rd Generation Partnership Project; Technical Specification Group Core Network and Terminals; 5G System; Network Function Repository Services; Stage 3 (Release 16)", 3GPP TS 29.510 v16.4.0, (Jul. 2020), 192 pages.

"3rd Generation Partnership Project; Technical Specification Group Core Network and Terminals; 5G System; Principles and Guidelines for Services Definition; Stage 3 (Release 16)", 3GPP TS 29.501 v16.3.0, (Mar. 2020), 70 pages.

"3rd Generation Partnership Project; Technical Specification Group Core Network and Terminals; 5G System; Technical Realization of Service Based Architecture; Stage 3 (Release 16)", 3GPP TS 29.500 v16.3.0, (Mar. 2020), 65 pages.

(Continued)

*Primary Examiner* — Lashonda Jacobs-Burton
(74) *Attorney, Agent, or Firm* — ALSTON & BIRD LLP

(57) ABSTRACT

An apparatus comprising means for performing: sending, to a network entity, a Network Function Discovery request comprising parameter information; and receiving, from the network entity, a response to the request, the response comprising: at least one identifier for at least one Network Function service producer; and at least one of: information ranking the at least one Network Function service producer according to how well the at least one Network Function service producer matches the request; and an indication of how much of the parameter information is matched by one or more parameters of the at least one Network Function service producer.

20 Claims, 7 Drawing Sheets

(56) References Cited

U.S. PATENT DOCUMENTS

| | | | |
|---|---|---|---|
| 11,509,728 B2* | 11/2022 | Landais | H04L 67/51 |
| 2020/0007632 A1* | 1/2020 | Landais | H04L 67/02 |
| 2020/0028921 A1 | 1/2020 | Cai et al. | |
| 2020/0136911 A1 | 4/2020 | Assali et al. | |
| 2020/0275255 A1* | 8/2020 | Wang | H04W 8/20 |
| 2021/0306211 A1* | 9/2021 | Landais | H04L 43/0817 |
| 2022/0038999 A1* | 2/2022 | Sapra | H04W 60/00 |
| 2022/0131945 A1* | 4/2022 | Sapra | H04L 47/12 |
| 2022/0232460 A1* | 7/2022 | Fu | H04L 63/0807 |
| 2022/0295386 A1* | 9/2022 | Lu | H04L 67/51 |
| 2023/0124206 A1* | 4/2023 | Khare | H04L 63/083 726/4 |

OTHER PUBLICATIONS

Fielding et al., "Hypertext Transfer Protocol (HTTP/1.1): Caching", Internet Engineering Task Force (IETF) Request for Comments: 7234, (Jun. 2014), 43 pages.

International Search Report and Written Opinion for Patent Cooperation Treaty Application No. PCT/FI2020/050517 dated Dec. 8, 2020, 13 pages.

Nokia et al., "NF Discover Procedure Enhancements", 3GPP TSG-CT WG4 Meeting #99e, C4-204183, (Aug. 18-28, 2020), 21 pages.

Extended European Search Report for European Application No. 20948165.4 dated Mar. 15, 2024, 9 pages.

\* cited by examiner

APPARATUS, METHOD AND COMPUTER READABLE MEDIUM FOR RANKING NETWORK FUNCTION SERVICE PRODUCERS

CROSS-REFERENCE TO RELATED APPLICATIONS

This application is a national phase entry of International Application No. PCT/FI2020/050517, filed Aug. 5, 2020, the contents of which are hereby incorporated by reference in their entirety.

FIELD

This disclosure relates to wireless communications. Some examples relate to providing service to network entities.

BACKGROUND

In some wireless networks, Network Function (NF) service producers may provide services to NF service consumers. NF service producers may register their NF profile in a Network Repository Function (NRF).

STATEMENT OF INVENTION

According to a first aspect there is provided an apparatus comprising means for performing: sending, to a network entity, a Network Function Discovery request comprising parameter information; receiving, from the network entity, a response to the request, the response comprising: at least one identifier for at least one Network Function service producer; and at least one of: information ranking the at least one Network Function service producer according to how well the at least one Network Function service producer matches the request; and an indication of how much of the parameter information is matched by one or more parameters of the at least one Network Function service producer.

According to some examples, the at least one identifier may comprise at least one Universal Resource Indicator of a profile of the Network Function service producer, the profile being registered in the network entity.

According to some examples, the parameter information comprises at least one query parameter, and an identifier for a Network Function service producer is included in the response to the request when the at least one query parameter matches the one or more parameters of the Network Function service producer.

According to some examples, the parameter information comprises at least one preference parameter specified by the apparatus; and wherein the indication comprises information of whether the at least one preference parameter is matched by the one or more parameters of the at least one Network Function service producer.

According to some examples, the at least one Network Function service producer comprises two or more Network Function service producers and the parameter information comprises at least one preference parameter specified by the apparatus; and wherein the response to the request comprises information ranking the two or more Network Function service producers according to how the at least one preference parameter is matched by the one or more parameters of each of the two or more Network Function service producers.

According to some examples, the indication ranking the two or more Network function service producers may be based on operator policies at the network entity.

According to some examples, the indication ranking the two or more Network function service producers may be based on network load.

According to some examples, the means are further configured to perform: determining one or more of the at least one Network Function service producer to retrieve based on the indication; sending, to the network entity, a Network Function Profile Retrieval request for the network entity to provide a Network Function profile for each of the determined one or more Network Function service producers; receiving, from the network entity, the Network Function profile of the determined one or more Network Function service producers.

According to some examples, the means are further configured to perform: caching the response from the network entity, the response comprising: the at least one identifier for at least one Network Function service producer; and at least one of: the information ranking the at least one Network Function service producer according to how well the at least one Network Function service producer matches the request; and the indication indicating how much of the parameter information is matched by parameters of the at least one Network Function service producer; and serving subsequent requests with the same parameter information using the cached response.

According to some examples, the request for the network entity to provide a Network Function profile for each of the determined one or more Network Function service producers comprises information regarding the apparatus, such as an identity and/or a network domain of the apparatus.

According to some examples, the request for the network entity to provide a Network Function profile for each of the determined one or more Network Function service producers comprises an authorization token received in the Network Function Discovery request response from the network entity.

According to some examples, the information regarding the apparatus comprises at least one of: a Network Function domain of the apparatus; a Single Network Slice Selection Assistance Information of the apparatus; a Public Land Mobile Network Identifier of the apparatus; and a Network Identifier of the apparatus.

According to some examples, the preference parameters comprise at least one of: one or more Tracking area Identity; one or more Application Programming Interface versions; one or more geographic locations.

According to some examples, the Network Function Discovery request may comprise a field indicating that the apparatus supports receiving, from the network entity, at least one of: the at least one identifier for at least one Network Function service producer; the indication; and the ranking information.

According to some examples, the network entity comprises a Network Repository Function.

According to some examples, the apparatus comprises a Network Function service consumer.

According to a second aspect there is provided an apparatus comprising: at least one processor; and at least one memory including computer program code; the at least one memory and the computer program code configured to, with the at least one processor, cause the apparatus at least to perform: sending, to a network entity, a Network Function Discovery request comprising parameter information; receiving, from the network entity, a response to the request, the response comprising: at least one identifier for at least one Network Function service producer; and at least one of: information ranking the at least one Network Function service producer according to how well the at least one Network Function service producer matches the request; and an indication of how much of the parameter information is matched by one or more parameters of the at least one Network Function service producer.

According to some examples, the at least one identifier may comprise at least one Universal Resource Indicator of a profile of the Network Function service producer, the profile being registered in the network entity.

According to some examples, the parameter information comprises at least one query parameter, and an identifier for a Network Function service producer is included in the response to the request when the at least one query parameter matches the one or more parameters of the Network Function service producer.

According to some examples, the parameter information comprises at least one preference parameter specified by the apparatus; and wherein the indication comprises information of whether the at least one preference parameter is matched by the one or more parameters of the at least one Network Function service producer.

According to some examples, the at least one Network Function service producer comprises two or more Network Function service producers and the parameter information comprises at least one preference parameter specified by the apparatus; and wherein the response to the request comprises information ranking the two or more Network Function service producers according to how the at least one preference parameter is matched by the one or more parameters of each of the two or more Network Function service producers.

According to some examples, the ranking of the two or more Network function service producers may be based on operator policies at the network entity.

According to some examples, the ranking of the two or more Network function service producers may be based on network load.

According to some examples, the at least one memory and the computer program code are further configured to, with the at least one processor, cause the apparatus at least to perform: determining one or more of the at least one Network Function service producer to retrieve based on the indication; sending, to the network entity, a Network Function Profile Retrieval request for the network entity to provide a Network Function profile for each of the determined one or more Network Function service producers; receiving, from the network entity, the Network Function profile of the determined one or more Network Function service producers.

According to some examples, the at least one memory and the computer program code are further configured to, with the at least one processor, cause the apparatus at least to perform: caching the response from the network entity, the response comprising: the at least one identifier for at least one Network Function service producer; and at least one of: the information ranking the at least one Network Function service producer according to how well the at least one Network Function service producer matches the request; and the indication indicating how much of the parameter information is matched by parameters of the at least one Network Function service producer; and serving subsequent requests with the same parameter information using the cached response.

According to some examples, the request for the network entity to provide a Network Function profile for each of the determined one or more Network Function service producers comprises information regarding the apparatus, such as an identity and/or a network domain of the apparatus.

According to some examples, the request for the network entity to provide a Network Function profile for each of the determined one or more Network Function service producers comprises an authorization token received in the Network Function Discovery request response from the network entity.

According to some examples, the information regarding the apparatus comprises at least one of: a Network Function domain of the apparatus; a Single Network Slice Selection Assistance Information of the apparatus; a Public Land Mobile Network Identifier of the apparatus; and a Network Identifier of the apparatus.

According to some examples, the preference parameters comprise at least one of: one or more Tracking area Identity; one or more Application Programming Interface versions; one or more geographic locations.

According to some examples, the Network Function Discovery request may comprise a field indicating that the apparatus supports receiving, from the network entity, at least one of: the at least one identifier for at least one Network Function service producer; the indication; and the ranking information.

According to some examples, the network entity comprises a Network Repository Function.

According to some examples, the apparatus comprises a Network Function service consumer.

According to a third aspect there is provided an apparatus comprising: circuitry for sending, to a network entity, a Network Function Discovery request comprising parameter information. The apparatus may further comprise circuitry for receiving, from the network entity, a response to the request, the response comprising: at least one identifier for at least one Network Function service producer; and at least one of: information ranking the at least one Network Function service producer according to how well the at least one Network Function service producer matches the request; and an indication of how much of the parameter information is matched by one or more parameters of the at least one Network Function service producer.

According to a fourth aspect there is provided a method comprising: sending, to a network entity, a Network Function Discovery request comprising parameter information; receiving, from the network entity, a response to the request, the response comprising: at least one identifier for at least one Network Function service producer; and at least one of: information ranking the at least one Network Function service producer according to how well the at least one Network Function service producer matches the request; and an indication of how much of the parameter information is matched by one or more parameters of the at least one Network Function service producer.

According to some examples, the at least one identifier may comprise at least one Universal Resource Indicator of a profile of the Network Function service producer, the profile being registered in the network entity.

According to some examples, the parameter information comprises at least one query parameter, and an identifier for a Network Function service producer is included in the response to the request when the at least one query parameter matches the one or more parameters of the Network Function service producer.

According to some examples, the parameter information comprises at least one preference parameter specified by the apparatus; and the indication comprises information of whether the at least one preference parameter is matched by the one or more parameters of the at least one Network Function service producer.

According to some examples, the at least one Network Function service producer comprises two or more Network Function service producers and the parameter information comprises at least one preference parameter specified by the apparatus; and the response to the request comprises information ranking the two or more Network Function service producers according to how the at least one preference parameter is matched by the one or more parameters of each of the two or more Network Function service producers.

According to some examples, the indication ranking the two or more Network function service producers may be based on operator policies at the network entity.

According to some examples, the indication ranking the two or more Network function service producers may be based on network load.

According to some examples, the method comprises: determining one or more of the at least one Network Function service producer to retrieve based on the indication; sending, to the network entity, a Network Function Profile Retrieval request for the network entity to provide a Network Function profile for each of the determined one or more Network Function service producers; receiving, from the network entity, the Network Function profile of the determined one or more Network Function service producers.

According to some examples, the method comprises: caching the response from the network entity, the response comprising: the at least one identifier for at least one Network Function service producer; and at least one of: the information ranking the at least one Network Function service producer according to how well the at least one Network Function service producer matches the request; and the indication indicating how much of the parameter information is matched by parameters of the at least one Network Function service producer; and serving subsequent requests with the same parameter information using the cached response.

According to some examples, the request for the network entity to provide a Network Function profile for each of the determined one or more Network Function service producers comprises information regarding the apparatus, such as an identity and/or a network domain of the apparatus.

According to some examples, the request for the network entity to provide a Network Function profile for each of the determined one or more Network Function service producers comprises an authorization token received in the Network Function Discovery request response from the network entity.

According to some examples, the information regarding the apparatus comprises at least one of: a Network Function domain of the apparatus; a Single Network Slice Selection Assistance Information of an apparatus performing the method; a Public Land Mobile Network Identifier of the apparatus performing the method; and a Network Identifier of the apparatus performing the method.

According to some examples, the preference parameters comprise at least one of: one or more Tracking area Identity; one or more Application Programming Interface versions; one or more geographic locations.

According to some examples, the Network Function Discovery request may comprise a field indicating that the apparatus supports receiving, from the network entity, at least one of: the at least one identifier for at least one Network Function service producer; the indication; and the ranking information.

According to some examples, the network entity comprises a Network Repository Function.

According to some examples, the method is performed by a Network Function service consumer.

According to a fifth aspect there is provided a computer program comprising instructions for causing an apparatus to perform at least the following: sending, to a network entity, a Network Function Discovery request comprising parameter information; receiving, from the network entity, a response to the request, the response comprising: at least one identifier for at least one Network Function service producer; and at least one of: information ranking the at least one Network Function service producer according to how well the at least one Network Function service producer matches the request; and an indication of how much of the parameter information is matched by one or more parameters of the at least one Network Function service producer.

According to a sixth aspect there is provided a computer program comprising instructions stored thereon for performing at least the following: sending, to a network entity, a Network Function Discovery request comprising parameter information; receiving, from the network entity, a response to the request, the response comprising: at least one identifier for at least one Network Function service producer; and at least one of: information ranking the at least one Network Function service producer according to how well the at least one Network Function service producer matches the request; and an indication of how much of the parameter information is matched by one or more parameters of the at least one Network Function service producer.

According to a seventh aspect there is provided a non-transitory computer readable medium comprising program instructions for causing an apparatus to perform at least the following: sending, to a network entity, a Network Function Discovery request comprising parameter information; receiving, from the network entity, a response to the request, the response comprising: at least one identifier for at least one Network Function service producer; and at least one of: information ranking the at least one Network Function service producer according to how well the at least one Network Function service producer matches the request; and an indication of how much of the parameter information is matched by one or more parameters of the at least one Network Function service producer.

According to an eighth aspect there is provided a non-transitory computer readable medium comprising program instructions stored thereon for performing at least the following: sending, to a network entity, a Network Function Discovery request comprising parameter information; receiving, from the network entity, a response to the request, the response comprising: at least one identifier for at least one Network Function service producer; and at least one of: information ranking the at least one Network Function service producer according to how well the at least one Network Function service producer matches the request; and an indication of how much of the parameter information is matched by one or more parameters of the at least one Network Function service producer.

According to a ninth aspect there is provided an apparatus comprising means for performing: receiving, from a network entity, a Network Function Discovery request comprising parameter information; sending, to the network entity, a response to the Network Function Discovery request comprising: at least one identifier for at least one Network Function service producer; and at least one of: information ranking the at least one Network Function service producer according to how well the at least one Network Function service producer matches the request; and an indication of how much of the parameter information is matched by one or more parameters of the at least one Network Function service producer.

According to some examples, the at least one identifier may comprise at least one Universal Resource Indicator of a profile of the Network Function service producer, the profile being registered in the network entity.

According to some examples, the parameter information comprises at least one query parameter, and an identifier for a Network Function service producer is included in the response to the request when the at least one query parameter matches the one or more parameters of the Network Function service producer.

According to some examples, the parameter information comprises at least one preference parameter specified by the network entity; and wherein the means are further configured to perform: determining information indicating if the least one preference parameter is matched by the one or more parameters of the at least one Network Function service producer; and sending the determined information in the indication of the response to the Network Function Discovery request.

According to some examples, the at least one Network Function service producer comprises two or more Network Function service producers and the parameter information comprises at least one preference parameter specified by the network entity; and wherein the means are further configured to perform: determining a ranking of the two or more Network Function service producers according to how the at least one preference parameter is matched by the one or more parameters of each of the two or more Network Function service producers; sending the ranking in the response to the request.

According to some examples, the ranking of the two or more Network function service producers may be based on operator policies at the apparatus.

According to some examples, the ranking of the two or more Network function service producers may be based on network load.

According to some examples, the means are further configured to perform: receiving, from the network entity, a request for the apparatus to provide a Network Function profile, wherein the request for the apparatus to provide the Network Function profile is determined based on at least one of: the information ranking the at least one Network Function service producer according to how well the at least one Network Function service producer matches the request; and the indication of how much of the parameter information is matched by one or more parameters of the at least one Network Function service producer; sending, to the network entity, the Network Function profile of the determined one or more Network Function service producers.

According to some examples, the request for the apparatus to provide a Network Function profile for each of the determined one or more Network Function service producers comprises information regarding the network entity, such as an identity and/or a network domain of the network entity.

According to some examples, the request for the apparatus to provide a Network Function profile for each of the determined one or more Network Function service producers comprises an authorization token received in the Network Function Discovery response from the apparatus.

According to some examples, the information regarding the network entity comprises at least one of: a Network Function domain of the network entity; a Single Network Slice Selection Assistance Information of the network entity; a Public Land Mobile Network Identifier of the network entity; and a Network Identifier of the network entity.

According to some examples, the preference parameters comprise at least one of: one or more Tracking area Identity; one or more Application Programming Interface versions; one or more geographic locations.

According to some examples, the Network Function Discovery request may comprise a field indicating that the network entity supports receiving, from the apparatus, the at least one identifier for at least one Network Function service producer and the indication.

According to some examples, the apparatus comprises a Network Repository Function.

According to some examples, the network entity comprises a Network Function service consumer.

According to a tenth aspect there is provided an apparatus comprising: at least one processor; and at least one memory including computer program code; the at least one memory and the computer program code configured to, with the at least one processor, cause the apparatus at least to perform: receiving, from a network entity, a Network Function Discovery request comprising parameter information; sending, to the network entity, a response to the Network Function Discovery request comprising: at least one identifier for at least one Network Function service producer; and at least one of: information ranking the at least one Network Function service producer according to how well the at least one Network Function service producer matches the request; and an indication of how much of the parameter information is matched by one or more parameters of the at least one Network Function service producer.

According to some examples, the at least one identifier may comprise at least one Universal Resource Indicator of a profile of the Network Function service producer, the profile being registered in the network entity.

According to some examples, the parameter information comprises at least one query parameter, and an identifier for a Network Function service producer is included in the response to the request when the at least one query parameter matches the one or more parameters of the Network Function service producer.

According to some examples, the parameter information comprises at least one preference parameter specified by the network entity; and wherein the means are further configured to perform: determining information indicating if the least one preference parameter is matched by the one or more parameters of the at least one Network Function service producer; and sending the determined information in the indication of the response to the Network Function Discovery request.

According to some examples, the at least one Network Function service producer comprises two or more Network Function service producers and the parameter information comprises at least one preference parameter specified by the network entity; and wherein the means are further configured to perform: determining a ranking of the two or more Network Function service producers according to how the at least one preference parameter is matched by the one or more parameters of each of the two or more Network Function service producers; sending the ranking in the response to the request.

According to some examples, the ranking of the two or more Network function service producers may be based on operator policies at the apparatus.

According to some examples, the ranking of the two or more Network function service producers may be based on network load.

According to some examples, the at least one memory and the computer program code are further configured to, with the at least one processor, cause the apparatus at least to perform: receiving, from the network entity, a request for the apparatus to provide a Network Function profile, wherein the request for the apparatus to provide the Network Function profile is determined based on at least one of: the information ranking the at least one Network Function service producer according to how well the at least one Network Function service producer matches the request; and the indication of how much of the parameter information is matched by one or more parameters of the at least one Network Function service producer; sending, to the network entity, the Network Function profile of the determined one or more Network Function service producers.

According to some examples, the request for the apparatus to provide a Network Function profile for each of the determined one or more Network Function service producers comprises information regarding the network entity, such as an identity and/or a network domain of the network entity.

According to some examples, the request for the apparatus to provide a Network Function profile for each of the determined one or more Network Function service producers comprises an authorization token received in the Network Function Discovery response from the apparatus.

According to some examples, the information regarding the network entity comprises at least one of: a Network Function domain of the network entity; a Single Network Slice Selection Assistance Information of the network entity; a Public Land Mobile Network Identifier of the network entity; and a Network Identifier of the network entity.

According to some examples, the preference parameters comprise at least one of: one or more Tracking area Identity; one or more Application Programming Interface versions; one or more geographic locations.

According to some examples, the Network Function Discovery request may comprise a field indicating that the network entity supports receiving, from the apparatus, the at least one identifier for at least one Network Function service producer and the indication.

According to some examples, the apparatus comprises a Network Repository Function.

According to some examples, the network entity comprises a Network Function service consumer.

According to an eleventh aspect there is provided an apparatus comprising: circuitry for receiving, from a network entity, a Network Function Discovery request comprising parameter information; circuitry for sending, to the network entity, a response to the Network Function Discovery request comprising: at least one identifier for at least one Network Function service producer; and at least one of: information ranking the at least one Network Function service producer according to how well the at least one Network Function service producer matches the request; and an indication of how much of the parameter information is matched by one or more parameters of the at least one Network Function service producer.

According to a twelfth aspect there is provided a method comprising: receiving, from a network entity, a Network Function Discovery request comprising parameter information; sending, to the network entity, a response to the Network Function Discovery request comprising: at least one identifier for at least one Network Function service producer; and at least one of: information ranking the at least one Network Function service producer according to how well the at least one Network Function service producer matches the request; and an indication of how much of the parameter information is matched by one or more parameters of the at least one Network Function service producer.

According to some examples, the at least one identifier may comprise at least one Universal Resource Indicator of a profile of the Network Function service producer, the profile being registered in the network entity.

According to some examples, the parameter information comprises at least one query parameter, and an identifier for a Network Function service producer is included in the response to the request when the at least one query parameter matches the one or more parameters of the Network Function service producer.

According to some examples, the parameter information comprises at least one preference parameter specified by the network entity; and wherein the method comprises: determining information indicating if the least one preference parameter is matched by the one or more parameters of the at least one Network Function service producer; and sending the determined information in the indication of the response to the Network Function Discovery request.

According to some examples, the at least one Network Function service producer comprises two or more Network Function service producers and the parameter information comprises at least one preference parameter specified by the network entity; and wherein method comprises: determining a ranking of the two or more Network Function service producers according to how the at least one preference parameter is matched by the one or more parameters of each of the two or more Network Function service producers; sending the ranking in the response to the request.

According to some examples, the ranking of the two or more Network function service producers may be based on operator policies at an apparatus performing the method.

According to some examples, the ranking of the two or more Network function service producers may be based on network load.

According to some examples, the method comprises: receiving, from the network entity, to provide a Network Function profile, wherein the request to provide the Network Function profile is determined based on at least one of: the information ranking the at least one Network Function service producer according to how well the at least one Network Function service producer matches the request; and the indication of how much of the parameter information is matched by one or more parameters of the at least one Network Function service producer; sending, to the network entity, the Network Function profile of the determined one or more Network Function service producers.

According to some examples, the request to provide the Network Function profile for each of the determined one or more Network Function service producers comprises information regarding the network entity, such as an identity and/or a network domain of the network entity.

According to some examples, the request to provide the Network Function profile for each of the determined one or more Network Function service producers comprises an authorization token received in the Network Function Discovery response from the apparatus.

According to some examples, the information regarding the network entity comprises at least one of: a Network Function domain of the network entity; a Single Network Slice Selection Assistance Information of the network entity; a Public Land Mobile Network Identifier of the network entity; and a Network Identifier of the network entity.

According to some examples, the preference parameters comprise at least one of: one or more Tracking area Identity; one or more Application Programming Interface versions; one or more geographic locations.

According to some examples, the Network Function Discovery request may comprise a field indicating that the network entity supports receiving the at least one identifier for at least one Network Function service producer and the indication.

According to some examples, the method is performed by a Network Repository Function.

According to some examples, the network entity comprises a Network Function service consumer.

According to a thirteenth aspect there is provided a computer program comprising instructions for causing an apparatus to perform at least the following: receiving, from a network entity, a Network Function Discovery request comprising parameter information; sending, to the network entity, a response to the Network Function Discovery request comprising: at least one identifier for at least one Network Function service producer; and at least one of: information ranking the at least one Network Function service producer according to how well the at least one Network Function service producer matches the request; and an indication of how much of the parameter information is matched by one or more parameters of the at least one Network Function service producer.

According to a fourteenth aspect there is provided a computer program comprising instructions stored thereon for performing at least the following: receiving, from a network entity, a Network Function Discovery request comprising parameter information; sending, to the network entity, a response to the Network Function Discovery request comprising: at least one identifier for at least one Network Function service producer; and at least one of: information ranking the at least one Network Function service producer according to how well the at least one Network Function service producer matches the request; and an indication of how much of the parameter information is matched by one or more parameters of the at least one Network Function service producer.

According to a fifteenth aspect there is provided a non-transitory computer readable medium comprising program instructions for causing an apparatus to perform at least the following: receiving, from a network entity, a Network Function Discovery request comprising parameter information; sending, to the network entity, a response to the Network Function Discovery request comprising: at least one identifier for at least one Network Function service producer; and at least one of: information ranking the at least one Network Function service producer according to how well the at least one Network Function service producer matches the request; and an indication of how much of the parameter information is matched by one or more parameters of the at least one Network Function service producer.

According to a sixteenth aspect there is provided a non-transitory computer readable medium comprising program instructions stored thereon for performing at least the following: receiving, from a network entity, a Network Function Discovery request comprising parameter information; sending, to the network entity, a response to the Network Function Discovery request comprising: at least one identifier for at least one Network Function service producer; and at least one of: information ranking the at least one Network Function service producer according to how well the at least one Network Function service producer matches the request; and an indication of how much of the parameter information is matched by one or more parameters of the at least one Network Function service producer.

BRIEF DESCRIPTION OF FIGURES

The invention will now be described in further detail, by way of example only, with reference to the following examples and accompanying drawings, in which.

DETAILED DESCRIPTION

The present disclosure relates to wireless communications.

The 5GC (5G Core network) is designed as a Service Based Architecture (SBA), with NF service producers exposing services to NF service consumers.

NF service producers may register their NF profile in an NRF. The NF profile may comprise NF level specific information and the list of NF service instances supported by the NF with their associated attributes.

NF Service consumers or Service Communication Proxies (SCP) discover NF service producers by performing an NF Discovery procedure towards the NRF with query parameters describing the services and/or properties of the NF service producers they wish to discover. The NRF returns the NF profiles of candidate NF service producers matching the query parameters in the response. An NF Discovery response will often contain NF profiles of multiple candidate producers.

Figure 1A:
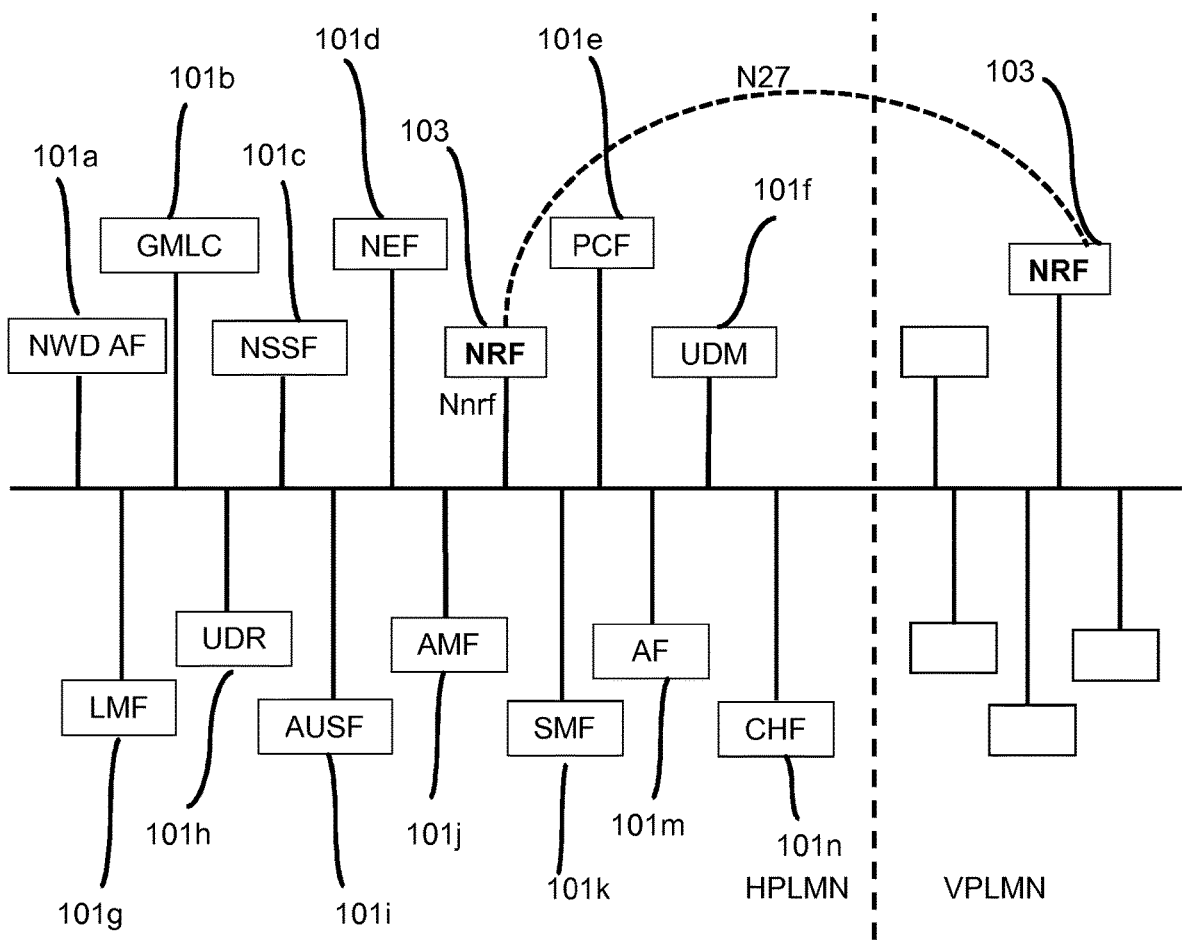
FIG. 1A shows a schematic representation of a network system.

As shown in FIG. 1A, in some examples, an NRF such as NRF 103 may be split across a Home Public Land Mobile Network (HPLMN) and a Virtual Public Land Mobile Network (VPLMN). In some examples, NRF 103 may be split over a HPLMN and VPLMN over an N27 interface. One or more NFs may be connected to an NRF 103. The one or more NFs may comprise at least one of: an Access and Mobility Management Function (AMF) 101*j*; a Session Management Function (SMF) 101*k*; a Unified Data Management service (UDM) 101*f*; a Unified Data Repository (UDR) 101*h*; a Policy Control Function (PCF) 101*e*; a Network Data Analytics Function (NWDAF) 101*a*; a Gateway Mobile Location Centre (GMLC) 101*b*; a Network Slice Selection Function (NSSF) 101*c*; a Network Exposure Function (NEF) 101*d*; a Location Management Function (LMF) 101*g*; an Authentication Server Function (AUSF) 101*i*; a Charging Function (CHF) 101*n*; and any other type of AF 101*m*.

Figure 1B:
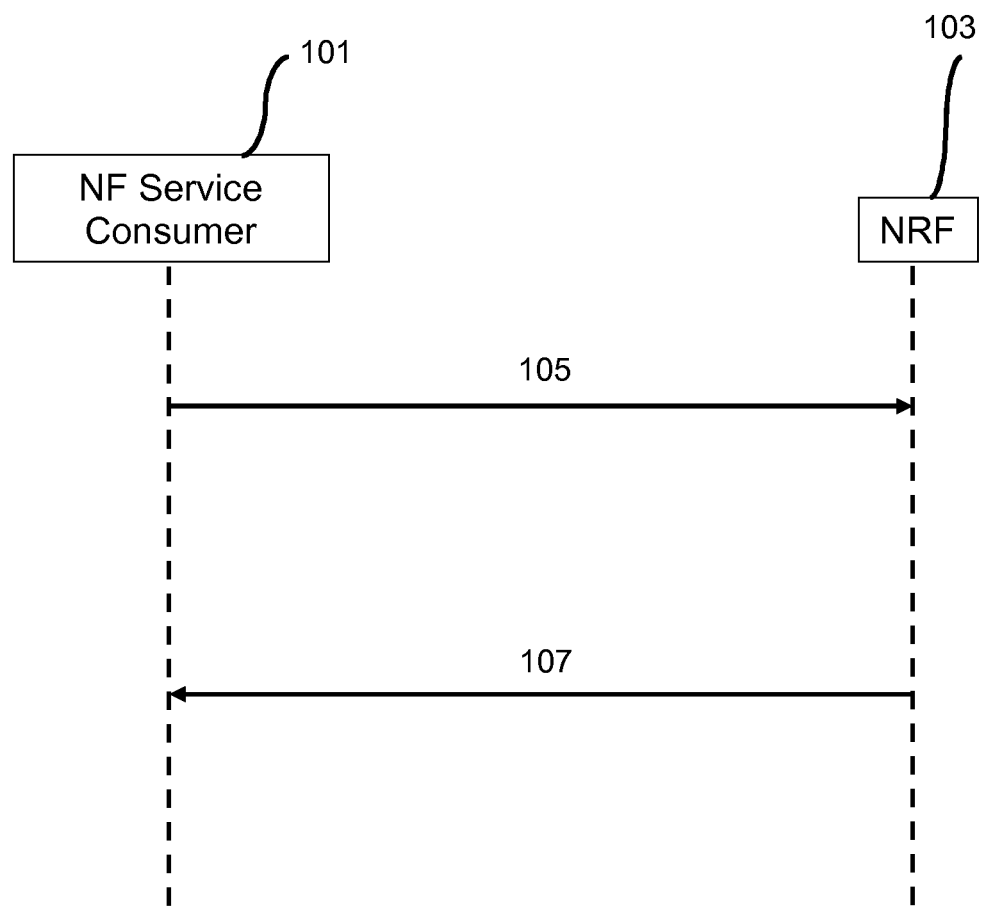
FIG. 1B shows a schematic representation of a message flow in a network.

FIG. 1B shows an example of an NF discovery procedure.

At 105, an NF Service Consumer 101 sends a NF Discovery request to NRF 103. The request may comprise parameters describing services and/or properties of the NF service producers that NF Service Consumer 101 (or the user of NF Service Consumer 101) desires to discover.

In some examples the message sent at 105 may comprise a GET message comprising the format "GET . . . /nf-instances?<query parameters>".

At 107, NRF 103 sends an NF Discovery response to NF Service Consumer 101. The response may comprise NF profiles of candidate NF service producers matching the desired services and/or properties sent at 105. In some examples, the response sent at 107 may comprise details of a problem with the query, which may mean that it is not possible to return NF profiles matching the query parameters.

In some examples, the response sent at 107 may comprise a "200 OK (SearchResult)" message. In some examples, the message sent at 107 may comprise a "2b. 4xx/5xx (ProblemDetails)" message.

NF Discovery responses returned by NRF 103, such as the response sent at 107, may contain NF profiles of multiple candidate producer NFs matching the query parameters sent at 105. The size of each NF profile may be very large. For example, Unified Data Management (UDM) profile sizes have been found to exceed 2 Million octets in some network deployments based on 3GPP Rel-15. It is expected that profile sizes will continue to grow as new functionalities are added to the 5G System (5GS), or other systems, at each 3GPP release.

In some cases, due to the large NF profiles and also due to the potential for multiple NF profiles to be returned by an NRF to a NF Service Consumer in response to a NF discovery request, the NF discovery response sent at 107 may possibly have very large payload size.

In some cases, large payload sizes may limit the number of candidate NF profiles that can be returned to the requester NF (such as NF service consumer 101). Further, in some cases the requester NF initiating the discovery procedure may be prevented from caching the data received in the NF discovery response for use for subsequent requests (as doing so would lead to excessive data to be cached for every request with different query parameter sent to the NRF).

In some examples, a NRF may return an NF discovery response to a requester NF. The NF discovery response may comprise identifiers such as Universal Resource Indicators (URIs) of NF profiles rather than full NF profiles. The identifiers may comprise "links" to NF profiles. By returning URIs or links, the data size of NF discovery responses can be reduced. In some examples, more NF profiles can be included in the NF discovery response due to the reduced data size of the link for each NF profile in the NF discovery response compared to sending the full NF profile.

In some examples, a requester NF may use Hypertext Transfer Protocol (HTTP) caching for the NF discovery procedure to reduce response time and to reduce network bandwidth consumption. Caching is discussed for example, in Internet Engineering Task Force (IETF), Request for Comments: 7234, Hypertext Transfer Protocol (HTTP/1.1): Caching, June 2014, ISSN: 2070-1721.

An HTTP cache may be considered to be a local store of response messages and the subsystem that controls storage, retrieval, and deletion of messages in the local store of store of response message. A cache may store responses in order to reduce the response time and network bandwidth consumption on future, equivalent (similar) requests.

A shared cache is a cache that may store responses to be reused by more than one user. A private cache may be dedicated to a single user.

A form of cache entry is a successful result of a retrieval request. An example for of a successful result of a retrieval request is a 200 (OK) response to a GET request, which contains a representation of the resource identified by the request target.

A primary cache key may comprise the request method and target URI. In some examples, caches may comprise one or more URI and reject request methods other than a GET request.

HTTP/2 is a protocol supported by the 5GC internal interfaces (Service Based Interfaces) and HTTP caching is one asset used for enhancing performance.

In some examples, the desired parameters in the discovery request may include query parameters that must be met by NF service provides. In some examples, the desired parameters in the discovery request may also comprise preference parameters. Query parameters comprising preference criteria may be considered to be preference parameters. Preference parameters may reflect preference criteria that need not necessarily be met by the NF service producers, e.g. preferred Tracking Area Identity (preferred-tai), preferred API versions (preferred-api-versions) or preferred localities (preferred-locality) to discover preferably NF service producers supporting certain Tracking Area, certain API versions or in a preferred target NF location (e.g. in a particular geographic location or at a particular data center).

Based on query parameters and preference parameters in a discovery request, and also based on operator policies in NRF (possibly related to any query parameter and/or preference parameter), an NRF may determine that certain NF service producers fit the discovery request better than others.

According to some examples, the NF Discovery Response sent from an NRF to a requester NF can indicate whether the returned NF profiles either match or do not match the preference parameters in the discovery request.

According to some examples, when an NRF discovery query has parameters of preferred choice, i.e. preferred-locality, preferred-tai, preferred-nf-instances, preferred-api-versions, etc., then NRF will return multiple NF profiles with matched and unmatched preference parameters.

According to some examples, an NRF may rank the different candidate NF profiles, e.g. based on operator policies and preference parameters of the discovery request and signal these ranks to the requester NF. In some examples, the NRF may also signal in the discovery response which preference parameters are matched by which NF profile. The requester NF may then determine which NF profiles match best the discovery request, based on the rank received for each NF profile URI (link) and/or the information on which preference parameters are matched by each candidate NF profile. The requester NF can then easily know which NF profiles returned in the discovery response match or do not match the preference parameters, without going through each returned NF profile to check itself if they match the preference parameters or not.

The ranking of different candidate NF profiles and/or the information indicating which preference parameters are matched by each NF profile may be considered to be correspondence information.

According to some examples, a requester NF may download part or all of one or more candidate network service producers having URIs in the network discovery response based on requirements at the requester NF. The requester NF may take into account the rank of each NF profile and/or information on which preference parameters are matched by each candidate NF profile.

Figure 2:
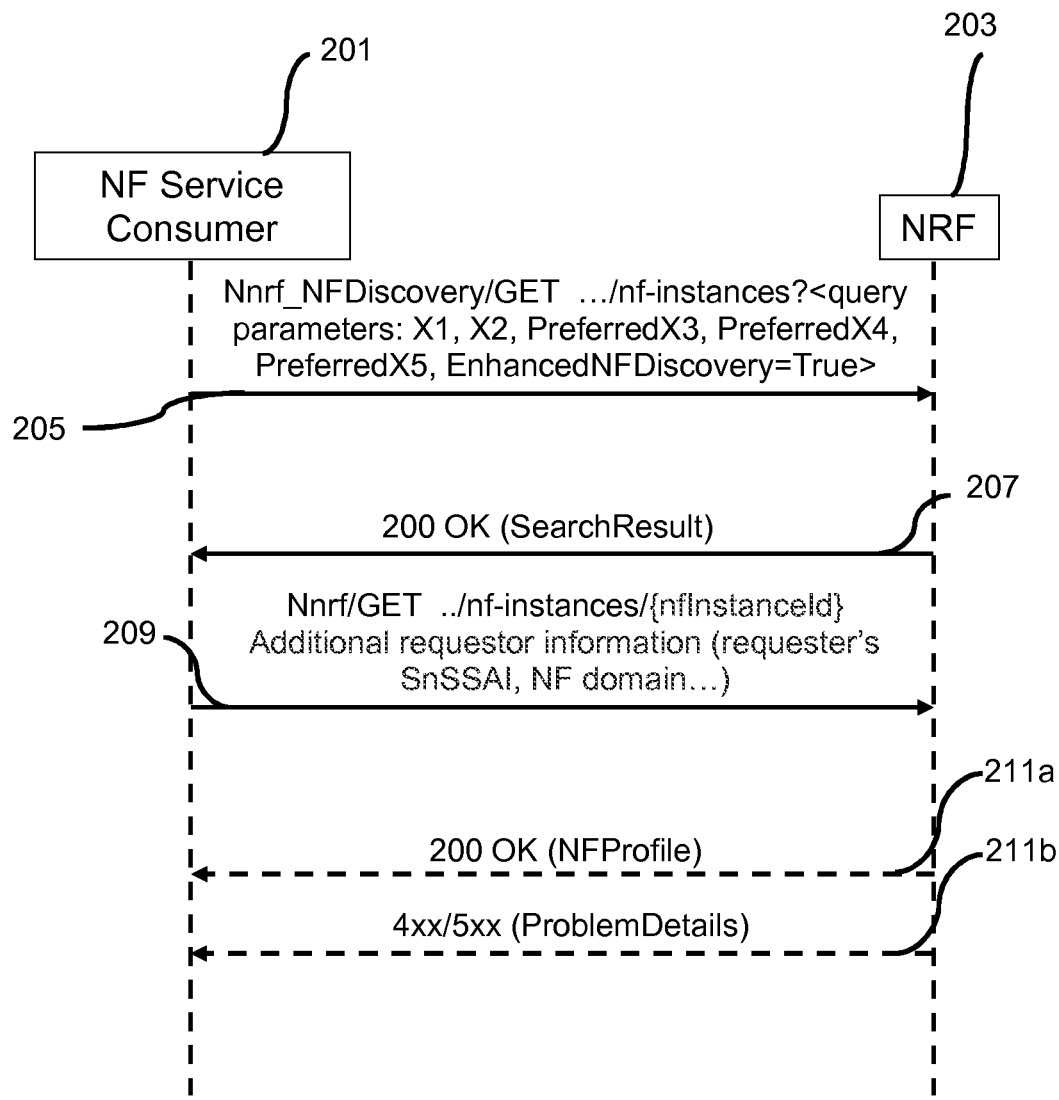
FIG. 2 shows a schematic representation of a message flow in a network.

FIG. 2 shows an example of a signal flow.

At 205, requester NF (NF Service Consumer) 201 sends an NF discovery request to NRF 203. The request may be a request for NF service producers. In some examples, at 205 requester NF 201 may indicate support of enhanced NF discovery described herein. Support of enhanced NF discovery may be signalled by an EnhancedNFDiscovery field in the NF Discovery Application Programming Interface (API) sent at 205.

The request at 205 may comprise desired parameter information comprising query parameters and preference parameters.

At 205, requester NF 201 may also send query parameters: X1, X2. The query parameters may be sent in a separate message to the message indicating support of enhanced NF discovery, or in the same message as the message indicating support of enhanced NF discovery.

At 205, requester NF 201 may also send preference parameters such as X3, X4, X5. There may be more or fewer preference parameters in some examples. Preference parameters may reflect preference criteria that need not necessarily be met by the NF service producers, e.g. preferred Tracking Area Identity (preferred-tai), preferred API versions (preferred-api-versions) or preferred localities (preferred-locality) to discover preferably NF service producers supporting certain Tracking Area, certain API versions or in a preferred target NF location (e.g. in a particular geographic location or at a particular data center).

The preference parameters may be sent in a separate message to the message indicating support of enhanced NF discovery, or in the same message as the message indicating support of enhanced NF discovery. In some examples, the indication of support of enhanced NF discovery, the query parameters and the preference parameters may be sent together in one message.

At 207, if the request at 205 indicates that the NF Service Consumer 201 does not support enhanced NF discovery, NRF 203 may proceed to respond as shown at 107 in FIG. 1B. In other words, if the requester NF 201 did not indicate support of enhanced NF discovery in the request sent at 205, NRF 203 may return a NF Discovery response directly including the NF profiles of the candidate producers, as per existing specifications.

At 207, if the request at 205 indicates that the NF Service Consumer 201 does support enhanced NF discovery, the NRF may proceed at 207 to send links including URIs pointing to NF Profiles corresponding to the parameters in message 205.

In some examples, for each URI link sent at 207, a rank reflecting how well the related candidate NF profile matches the request sent at 205 may be included. In some examples, information indicating which preference query parameter(s) are matched (or not matched) by the NF profile can be included.

The response sent at 207 may include correspondence information comprising a rank reflecting how well each candidate NF profile matches the request sent at 205 and/or information indicating which preference query parameter(s) are matched (or not matched) by each NF profile.

Based on the query parameters, preference parameters and also based on operator policies at NRF 203 (possibly related to any query parameter or preference parameter), NRF 203 may determine that certain NF service producers that match the discovery request fit better than others.

In some examples, NRF 203 may assign different ranks to each candidate NF profile, based on how well they match the preference parameters and other query parameters sent at 205. In some examples, the ranks may also be based on operator policies at the NRF and possibly other criteria (e.g. load).

The message sent at 207 may comprise a list of NF Profile URIs corresponding to the query parameters of the NF discovery request sent at 205. In the example of FIG. 2, the query parameters are X1 and X2, but there may be more or fewer query parameters in other examples.

The list sent at 207 may optionally include ranks corresponding to each NF Profile URI. In some examples, the list sent at 207 may also comprise information regarding whether preference parameters are matched.

An example of information that may be sent at 207 is shown in Table 1.

TABLE 1

| NFProfile URI | Rank | Matched or Not matched parameters |
|---|---|---|
| NFProf3_URI | 1 | X3, X4, X5: matched |
| NFProf1_URI | 2 | X3, X5: matched, X4: not matched |
| NFProf2_URI | 2 | X3, X5: matched, X4: not matched |
| NFProf4_URI | 3 | X4: matched, X3, X5: not matched |

In the example of Table, 1, each listed profile matches query parameters X1 and X2.

In the example of Table 1, the link (URI) pointing to NF Profile 3 is ranked the highest (i.e. the best match) with respect to the query sent at 205. NRF 203 indicates that this profile matches all the preference parameters X3, X4 and X5.

In the example of Table 1, the links (URIs) pointing to NF Profiles 1 and 2 are ranked as the (joint) second best choice. NRF 203 indicates that both profiles match parameters X3 and X5, but not parameter X4.

In the example of Table 1, the link (URI) pointing to NF Profile 4 is ranked the lowest and this profile only matches the X4 preference parameter.

Requester NF 201 may cache the response sent at 207. By using URIs, the response sent at 207 is typically a smaller size than the size of the response sent at 107 which comprises full NF profiles. This makes the response sent at 207 easier to cache (at requester NF 201 for example), and also reduces signalling overhead associated with the response sent at 207.

Following receipt of the search result sent at 207, requester NF 201 determines the NF profile(s) it wishes or needs to retrieve from NRF 203. This may be the highest ranked NF profile URI(s) in the search result sent at 207. In some examples, in making the determination of which NF profile(s) to download, requester NF 201 may determine to download the highest ranked NF profiles matching the preference parameters that not have been downloaded yet from the NRF.

In cases where a query is formulated to be sent to NRF 203, or is sent from another apparatus to requester NF 201 to be forwarded to NRF 203, if the query parameters are the same as a previous query that has been sent to NRF 203 by requester NF 201, the requester NF 201 may serve the query using a response from NRF 203 cached at requester NF 201. Requester NF 201 can use cached query responses to serve subsequent query requests with the same query parameters as the cached query response. Requester NF 201 can use cached NF Discovery Request responses to serve subsequent NF Discovery Requests with the same query parameters as the cached NF Discovery Request response.

In step 209, requester NF 201 can send a request to NRF 203 for the NF profile that requester NF 201 wishes to download. This NF profile may be determined to be downloaded by requester NF 201 based on the response received at 207.

In some examples, requester NF 201 may use an Nnrf NFManagement API (GET) service operation to retrieve the NF profile(s) of URIs received in the discovery response at 207.

At step 209, requester NF 201 requests NRF 203 to provide the one or more NF profiles that requester NF 201 wishes to retrieve. The request may be made in a an NF Profile Retrieval Request. Requester NF 201 may send a NF Instance Identifier (NFInstanceID) of the NF profile that requester NF 201 wishes to retrieve. The NF profile may correspond to the URI that was received in the NF Discovery response at 207. For example, the URI may take the form:
https://nnrf-nfm/v1/
nrf.5gc.mnc345.mcc012.3gppnetwork.orginf-instances/
4947a69a-f61b-4bc1-b9da-47c9c5d14b64 where 4947a69a-f61b-4bc1-b9da-47c9c5d14b64 represents the {NFInstanceId} shown in FIG. 2.

According to some examples, the request sent at 209 may comprise information regarding requester NF 207. For example, the request may comprise one of more of requester's: Single Network Slice Selection Assistance Information (S-NSSAI); NF domain; Public Land Mobile Network Identifier (PLMN ID); and Network Identifier (NID). This allows NRF 203 to verify that requester NF is allowed to access the NF profile requested at 209.

According to some examples, the Nnrf NFManagement API (GET) is modified to enable information regarding requester NF 207 to be carried. For example, the Nnrf NFManagement API (GET) may be extended to carry one or more of the requester's: S-NSSAI; NF domain; PLMN ID; NID; etc. This information can enable the NRF to verify that the requester NF is allowed to access the NF profile.

In some examples, NRF 203 may return in the NF Discovery Response at 207 an access authorization token to NF Service Consumer 201 that can used for the subsequent NF profile request at 209 request. In such an example, the requester NF 201 can include the access authorization token received in the NF Discovery response at 207 when requesting to retrieve NF profiles at 209. The access authorization token can be used to 209 indicate to NRF 203 that NF service consumer 201 is authorized to access the requested NF profile(s) at 209.

At 211a, NRF 203 returns the one or more NF profiles requested at 209 by requester NF 201. In some examples, NRF 203 only returns one or more NF profiles that NF service consumer 201 is authorized to retrieve. NRF 203 may determine which NF profiles NF service consumer 201 is authorized to retrieve based on at least one of the NF Service Consumer 201's: S-NSSAI; NF domain; PLMN ID; NID; etc and/or based on an access authorization token included in the request at 209.

In examples where there is a problem returning one or more of the NF profiles requested at 209, may send a failure message at 211b. The failure message may comprise details of the problem. The problem may be caused by a lack of authorization for the NF Service Consumer 201 for the requested NF profile at 209, or by a malfunction at NRF 203, for example.

It will be understood that although 205, 207, 209, 211a and 211b are shown in a single message flow in FIG. 2, it is not necessary for all of these actions to be present. For example, 205 and 207 may be carried out without the presence of 209, 211a and 211b. Further, 209 and 211a and/or 211b may be carried out without the presence of 205 and 207, for example.

Figure 3:
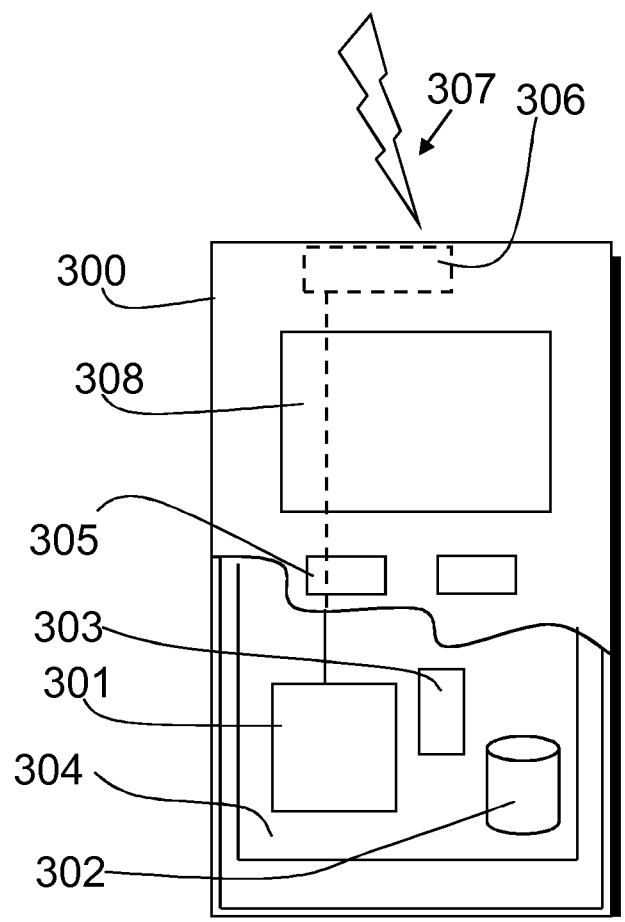
FIG. 3 shows schematic representation of an apparatus according to an example.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 304. The user may control the operation of the wireless device by means of a suitable user interface such as key pad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto. The communication devices 302, 304, 305 may access the communication system based on various access techniques.

Figure 4:
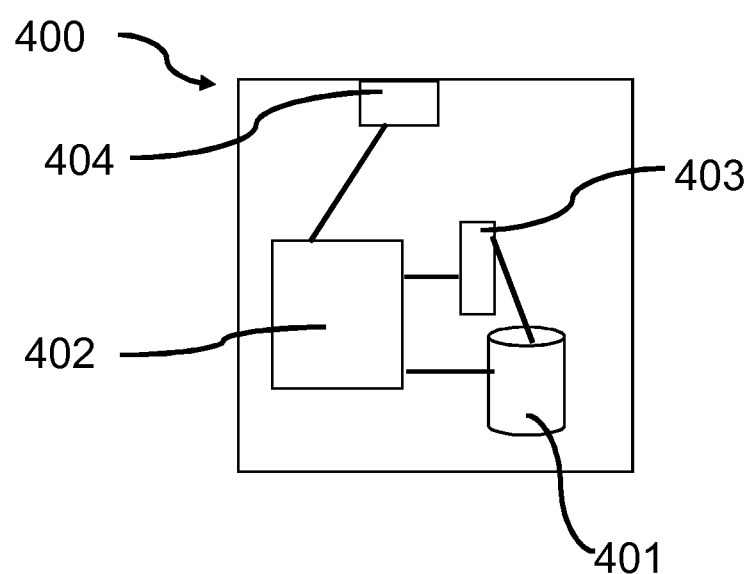
FIG. 4 shows schematic representation of an apparatus according to an example.

FIG. 4 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, or an IAB or relay node. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 400 can be arranged to provide control on communications in the service area of the system. The control apparatus 400 comprises at least one memory 401, at least one data processing unit 402, 403 and an input/output interface 404. Via the interface the control apparatus can be coupled to a receiver and a transmitter of the base station. The receiver and/or the transmitter may be implemented as a radio front end or a remote radio head. For example, the control apparatus 400 or processor 401 can be configured to execute an appropriate software code to provide the control functions.

Figure 5:
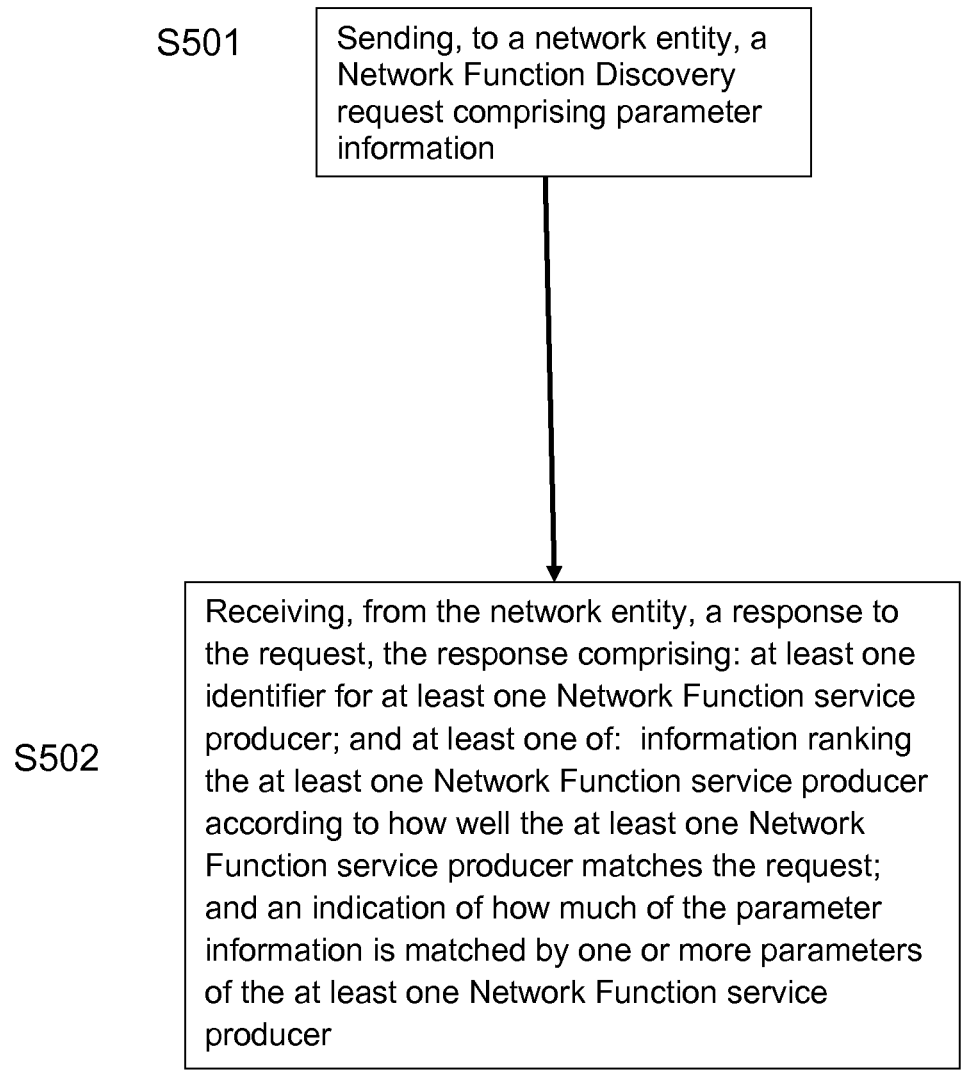
FIG. 5 shows a flow chart of a method.

FIG. 5 is a flow chart of a method according to an example. The flow chart of FIG. 5 is viewed from the perspective of an apparatus such as NF Service Consumer 201. The method may be performed by an NF Service Consumer.

At S501, the method comprises sending, to a network entity, a NF Discovery request comprising parameter information. The network entity may comprise, for example, an NRF such as NRF 203.

At S502, the method comprises receiving, from the network entity, a response to the request. The response may comprise at least one identifier for at least one Network Function service producer. The at least one identifier may comprise at least one URI. In some examples, the response may comprise information ranking the at least one Network Function service producer according to how well the at least one Network Function service producer matches the request. The ranking may be based on how well the at least one Network Function service producer matches the parameter information in the request. In some examples, the response may comprise an indication of how much of the parameter information is matched by one or more parameters of the at least one Network Function service producer.

Figure 6:
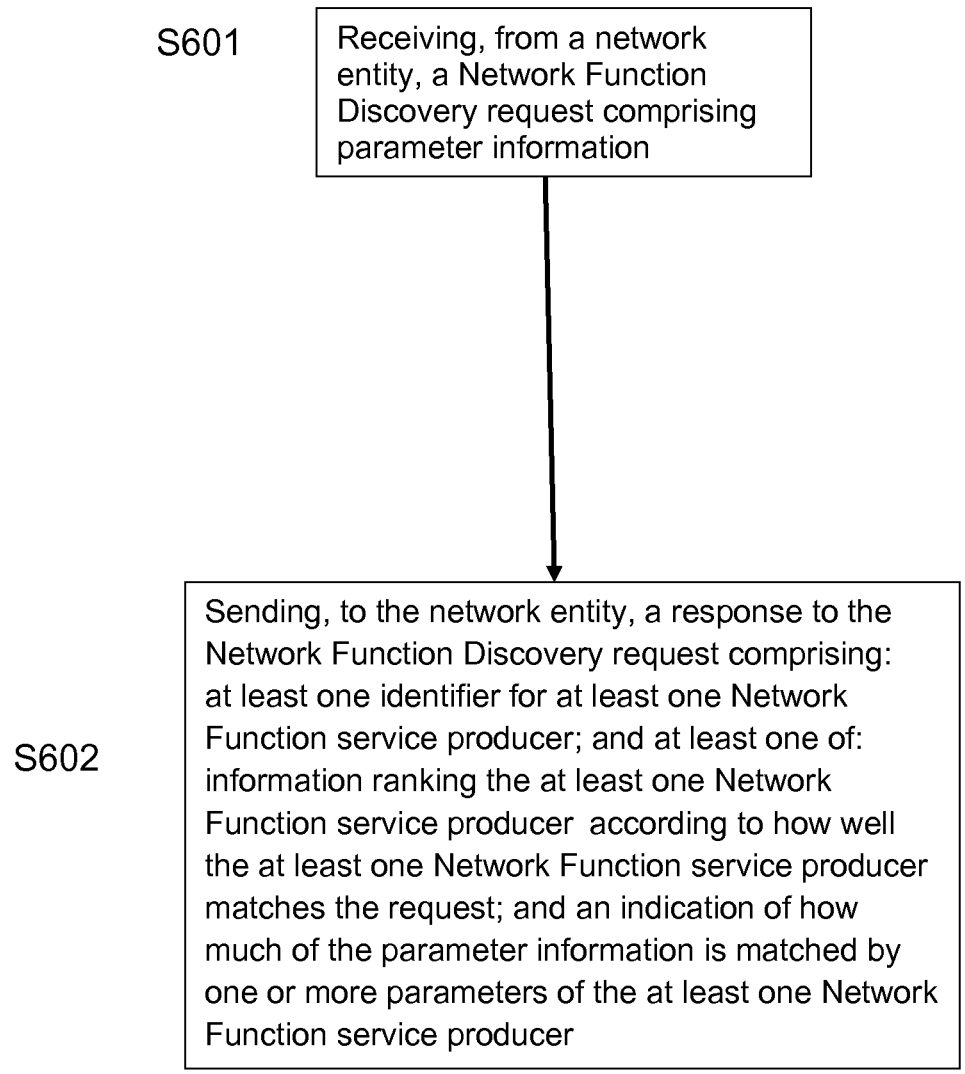
FIG. 6 shows a flow chart of a method.

FIG. 6 is a flow chart of a method according to an example. The flow chart of FIG. 6 is viewed from the perspective of an apparatus such as NRF 203. The method may be performed by an NRF.

At S601, the method comprises receiving, from a network entity, a Network Function Discovery request comprising parameter information. The network entity may be an NF Service Consumer, such as NF Service Consumer 201.

At S602, the method comprises sending, to the network entity, a response to the NF Discovery request. The response may comprise at least one identifier for at least one Network Function service producer. The at least one identifier may comprise at least one URI. In some examples, response may comprise information ranking the at least one Network Function service producer according to how well the at least one Network Function service producer matches the request. The ranking may be based on how well the at least one Network Function service producer matches the parameter information in the request. In some examples, the response may comprise an indication of how much of the parameter information is matched by one or more parameters of the at least one Network Function service producer.

It will be understood that the described steps of the methods above are not necessarily purely sequential, according to some examples.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising:
at least one processor; and
at least one memory including computer program code, the at least one memory and the computer program code configured to, with the at least one processor, cause the apparatus at least to perform:
sending, to a network entity, a Network Function Discovery request comprising parameter information, the parameter information comprising at least one preference parameter specified by the apparatus; and
receiving, from the network entity, a response to the request, the response comprising:
at least one identifier for respective Network Function service producers of two or more Network Function service producers; and at least one of:
information ranking the two or more Network Function service producers according to how well each Network Function service producer of the two or more Network Function service producers matches the request; or
an indication of how much of the parameter information is matched by one or more parameters of the two or more Network Function service producers, and
wherein the response to the request comprises information ranking the two or more Network Function service producers according to how well the at least one preference parameter is matched by the one or more parameters of each respective Network Function service producer of the two or more Network Function service producers.

2. An apparatus according to claim 1, wherein the parameter information comprises at least one query parameter, and an identifier for a Network Function service producer is included in the response to the request when the at least one query parameter matches the one or more parameters of the Network Function service producer.

3. An apparatus according to claim 1 wherein the indication comprises information of whether the at least one preference parameter is matched by the one or more parameters of the two or more Network Function service producers.

4. An apparatus according to claim 1, wherein the at least one memory and the computer program code are further configured to, with the at least one processor, cause the apparatus at least to perform:
determining one or more of the two or more Network Function service producers to retrieve based on the indication;
sending, to the network entity, a Network Function Profile Retrieval request for the network entity to provide a Network Function profile for each of the determined two or more Network Function service producers; and
receiving, from the network entity, the Network Function profile of the determined two or more Network Function service producers.

5. An apparatus according to claim 1, wherein the at least one memory and the computer program code are further configured to, with the at least one processor, cause the apparatus at least to perform:
caching the response from the network entity, the response comprising:
the at least one identifier for respective Network Function service producers of the two or more Network Function service producers; and
at least one of:
the information ranking the two or more Network Function service producers according to how well the each Network Function service producer of the two or more Network Function service producers matches the request; and
the indication indicating how much of the parameter information is matched by parameters of the two or more Network Function service producers; and
serving subsequent requests with the same parameter information using the cached response.

6. An apparatus comprising:
at least one processor; and
at least one memory including computer program code, the at least one memory and the computer program code configured to, with the at least one processor, cause the apparatus at least to perform:
receiving, from a network entity, a Network Function Discovery request comprising parameter information, the parameter information comprising at least one preference parameter specified by the network entity; and
sending, to the network entity, a response to the Network Function Discovery request comprising:
at least one identifier for respective Network Function service producers of two or more Network Function service producers; and at least one of:
information ranking the two or more Network Function service producers according to how well the each Network Function service producer of the two or more Network Function service producers matches the request; or
an indication of how much of the parameter information is matched by one or more parameters of the two or more Network Function service producers, wherein the at least one memory and the computer program code are further configured to, with the at least one processor, cause the apparatus to perform:
determining a ranking of the two or more Network Function service producers according to how well the at least one preference parameter is matched by the one or more parameters of each respective Network Function service producer of the two or more Network Function service producers; and
sending the ranking in the response to the request.

7. An apparatus according to claim 6, wherein the parameter information comprises at least one query parameter, and an identifier for a Network Function service producer is included in the response to the request when the at least one query parameter matches the one or more parameters of the Network Function service producer.

8. An apparatus according to claim 6, wherein the at least one memory and the computer program code are further configured to, with the at least one processor, cause the apparatus at least to perform:
determining information indicating if the least one preference parameter is matched by the one or more parameters of the two or more Network Function service producers; and
sending the determined information in the indication of the response to the Network Function Discovery request.

9. An apparatus according to claim 6, wherein the at least one memory and the computer program code are further configured to, with the at least one processor, cause the apparatus to perform:
receiving, from the network entity, a request for the apparatus to provide a Network Function profile, wherein the request for the apparatus to provide the Network Function profile is determined based on at least one of: the information ranking the two or more Network Function service producers according to how well the each Network Function service producer of the two or more Network Function service producers matches the request; and the indication of how much of the parameter information is matched by one or more parameters of the two or more Network Function service producers; and
sending, to the network entity, the Network Function profile of the determined two or more Network Function service producers.

10. A method comprising:
sending, to a network entity, a Network Function Discovery request comprising parameter information, the parameter information comprising at least one preference parameter; and
receiving, from the network entity, a response to the request, the response comprising:
at least one identifier for respective Network Function service producers of two or more Network Function service producers; and at least one of:
information ranking the two or more Network Function service producers according to how well each Network Function service producer of the two or more Network Function service producers matches the request; or
an indication of how much of the parameter information is matched by one or more parameters of the two or more Network Function service producers, and
wherein the response to the request comprises information ranking the two or more Network Function service producers according to how well the at least one preference parameter is matched by the one or more parameters of each respective Network Function service producer of the two or more Network Function service producers.

11. A method according to claim 10, wherein the parameter information comprises at least one query parameter, and an identifier for a Network Function service producer is included in the response to the request when the at least one query parameter matches the one or more parameters of the Network Function service producer.

12. A method according to claim 10,
wherein the indication comprises information of whether the at least one preference parameter is matched by the one or more parameters of the two or more Network Function service producers.

13. A method according to claim 10, wherein the method comprises:
determining one or more of the two or more Network Function service producers to retrieve based on the indication;
sending, to the network entity, a Network Function Profile Retrieval request for the network entity to provide a Network Function profile for each of the determined two or more Network Function service producers; and
receiving, from the network entity, the Network Function profile of the determined two or more Network Function service producers.

14. A method according to claim 10, wherein the method comprises:
caching the response from the network entity, the response comprising:
the at least one identifier for respective Network Function service producers of the two or more Network Function service producers; and at least one of:
the information ranking the two or more Network Function service producers according to how well the each Network Function service producer of the two or more Network Function service producers matches the request; and
the indication indicating how much of the parameter information is matched by parameters of the two or more Network Function service producers; and
serving subsequent requests with the same parameter information using the cached response.

15. A method comprising:
receiving, from a network entity, a Network Function Discovery request comprising parameter information, the parameter information comprising at least one preference parameter specified by the network entity; and
sending, to the network entity, a response to the Network Function Discovery request comprising:
at least one identifier for respective Network Function service producers of two or more Network Function service producers; and at least one of:
information ranking two or more Network Function service producers according to how well the each Network Function service producer of the two or more Network Function service producers matches the request; or
an indication of how much of the parameter information is matched by one or more parameters of the two or more Network Function service producers, and
wherein method further comprises:
determining a ranking of the two or more Network Function service producers according to how well the at least one preference parameter is matched by the one or more parameters of each respective Network Function service producer of the two or more Network Function service producers; and sending the ranking in the response to the request.

16. A method according to claim 15, wherein the parameter information comprises at least one query parameter, and an identifier for a Network Function service producer is included in the response to the request when the at least one query parameter matches the one or more parameters of the Network Function service producer.

17. A method according to claim 15, wherein the method comprises:
   determining information indicating if the least one preference parameter is matched by the one or more parameters of the two or more Network Function service producers; and
   sending the determined information in the indication of the response to the Network Function Discovery request.

18. A method according to claim 15, wherein the method comprises:
   receiving, from the network entity, a request to provide a Network Function profile, wherein the request to provide the Network Function profile is determined based on at least one of: the information ranking the two or more Network Function service producers according to how well the each Network Function service producer of the two or more Network Function service producers matches the request; and the indication of how much of the parameter information is matched by one or more parameters of the two or more Network Function service producers; and
   sending, to the network entity, the Network Function profile of the determined two or more Network Function service producers.

19. A non-transitory computer readable medium comprising instructions for causing an apparatus to perform at least the following:
   sending, to a network entity, a Network Function Discovery request comprising parameter information, the parameter information comprising at least one preference parameter specified by the apparatus; and
   receiving, from the network entity, a response to the request, the response comprising:
   at least one identifier for respective Network Function service producers of two or more Network Function service producers; and at least one of:
   information ranking the two or more Network Function service producers according to how well each Network Function service producer of the two or more Network Function service producers matches the request; or
   an indication of how much of the parameter information is matched by one or more parameters of the two or more Network Function service producers, and
   wherein the response to the request comprises information ranking the two or more Network Function service producers according to how well the at least one preference parameter is matched by the one or more parameters of each respective Network Function service producer of the two or more Network Function service producers.

20. A non-transitory computer readable medium comprising instructions for causing an apparatus to perform at least the following:
   receiving, from a network entity, a Network Function Discovery request comprising parameter information, the parameter information comprising at least one preference parameter specified by the network entity; and
   sending, to the network entity, a response to the Network Function Discovery request comprising:
   at least one identifier for respective Network Function service producers of two or more Network Function service producers; and at least one of:
   information ranking the two or more Network Function service producers according to how well each Network Function service producer of the two or more Network Function service producers matches the request; or
   an indication of how much of the parameter information is matched by one or more parameters of the two or more Network Function service producers, and
   wherein the instructions further cause the apparatus to perform:
   determining a ranking of the two or more Network Function service producers according to how well the at least one preference parameter is matched by the one or more parameters of each respective Network Function service producer of the two or more Network Function service producers; and
   sending the ranking in the response to the request.

\* \* \* \* \*

UNITED STATES PATENT AND TRADEMARK OFFICE
CERTIFICATE OF CORRECTION

PATENT NO. : 12,041,139 B2
APPLICATION NO. : 18/040616
DATED : July 16, 2024
INVENTOR(S) : Bruno Landais et al.

It is certified that error appears in the above-identified patent and that said Letters Patent is hereby corrected as shown below:

In the Claims

In Column 22, Line 35, Claim 5, delete "the each" and insert -- each --, therefor.

In Column 22, Line 61, Claim 6, delete "the each" and insert -- each --, therefor.

In Column 23, Line 38, Claim 9, delete "the each" and insert -- each --, therefor.

In Column 24, Line 36, Claim 14, delete "the each" and insert -- each --, therefor.

In Column 24, Line 57, Claim 15, delete "the each" and insert -- each --, therefor.

In Column 25, Line 25, Claim 18, delete "the each" and insert -- each --, therefor.

Signed and Sealed this
Tenth Day of December, 2024

Katherine Kelly Vidal
*Director of the United States Patent and Trademark Office*